UNITED STATES PATENT OFFICE.

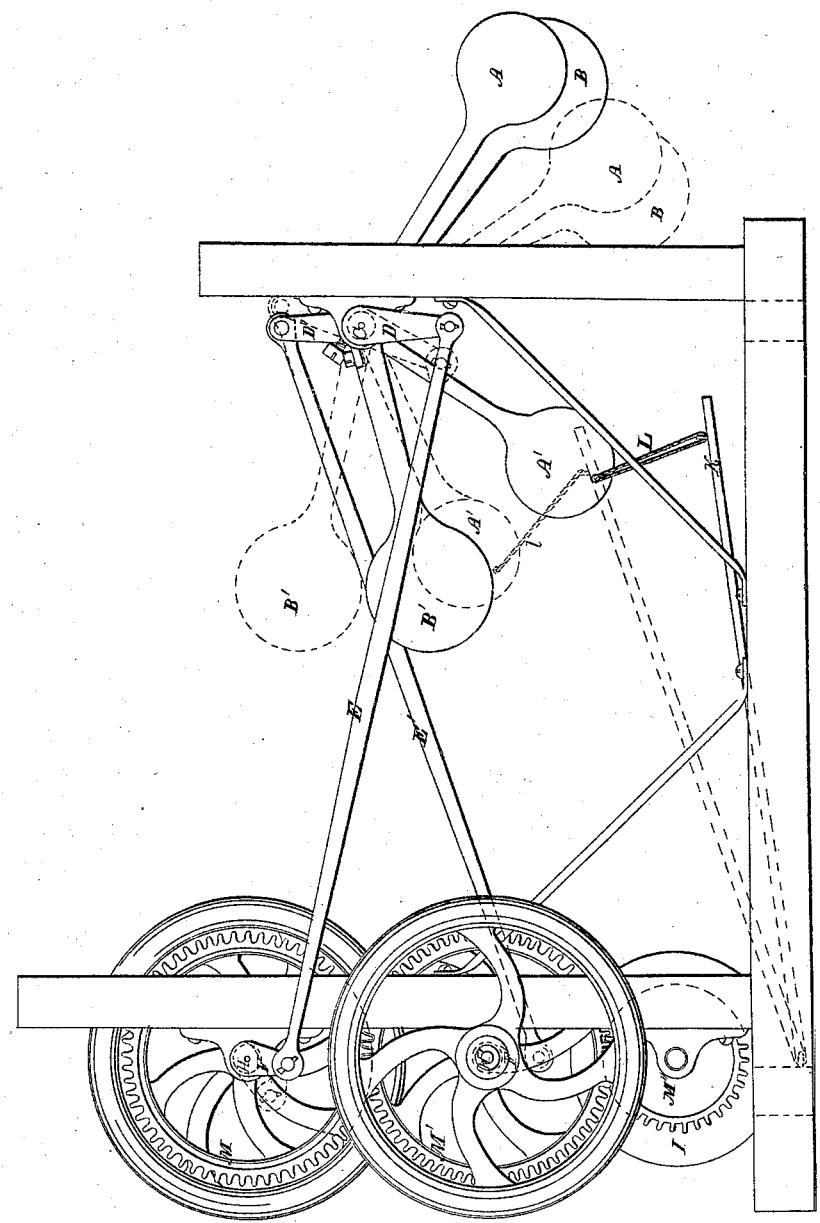

JOHN G. MITCHELL, OF COLLINGTON, MARYLAND.

IMPROVEMENT IN MOTIVE POWERS.

Specification forming part of Letters Patent No. 23,104, dated March 1, 1859.

*To all whom it may concern:*

Be it known that I, JOHN G. MITCHELL, of Prince George's county, in the State of Maryland, have invented a new and Improved Motive Power; and I do hereby declare that the following is a full and clear description of the construction and operation of the same, reference being had to the annexed drawing, making a part of this specification, in which the figure is a longitudinal elevation.

The nature of my invention consists in the adaptation of weight for the production of mechanical power; and to enable others skilled in the art to make and use my invention I will proceed to describe its construction and operation.

A A' represent weights of pendulum shape, (to diminish or overcome atmospheric resistance,) attached to shaft C by set-screws or otherwise, and are so arranged that when *in equilibrio* the cranks D and D' at the extremities of said shaft are reversed in their position, the one being up and the other down. The shafts H H', equally distant above and below shaft C, have at their alternate opposite ends a small crank, F and F', half the length of the long cranks D D'. These cranks being connected by the rods E E' with each other, and being in proportion of two, three, &c., to one, the long crank will perform a proportionate arc of a circle while the small crank will revolve once. The shafts H H' are connected by the gear-wheels M M', and operated by the connecting-rods E E', said rods being of equal length and forming on opposite sides equal alternate opposite angles.

I is a fly or band wheel communicating the generated power to the machine worked, and is put in motion by means of the pinion M'', affixed to the same spindle and operated by the gear-wheel M'.

K is a treadle, operated by the foot or otherwise, and connected with the weight A' by the rope L. When disconnected from the treadle, the weights A A' are *in equilibrio*, and together equal the sum of the resistances from shaft C, the beginning of friction to pulley I, its termination; hence, if the application of any amount of power, whether by hand or foot, to weight A' will produce a revolution of the pulley I and communicate itself by means of a band upon said pulley to the working-machine attached, any increased weight, as B B', affixed to the same shaft must effect a corresponding increase of power to said machine.

Having thus fully described the nature and operation of my invention, what I claim as new, and desire to secure by Letters Patent, is—

The application of weights A A' and B B' in connection with shaft C and treadle K, so that when disconnected from the treadle K the weights A and A' and B and B' are *in equilibrio* and subject to be moved by any agency applied to either weight at the end of the lever or arms, so as to produce motion in the machinery at the termination of the machine proper at I, arranged and operating in the manner and for the purposes above described.

JOHN G. MITCHELL.

Witnesses:
F. I. MURPHY,
B. F. MORSELL.